United States Patent Office 2,851,427
Patented Sept. 9, 1958

2,851,427
METHOD OF PURIFYING CATALYSTS

George G. Joris, Princeton, N. J., assignor to the United States of America as represented by the United States Atomic Energy Commission No Drawing. Application March 22, 1945
Serial No. 584,254

3 Claims. (Cl. 252—411)

This invention relates to the purification of catalysts and more particularly to a method of removing small quantities of chlorine from a finely divided platinum catalyst.

As conducive to a clearer understanding of the present invention it may be pointed out that finely divided platinum catalysts are used for catalyzing a wide variety of industrial processes. Such catalysts are frequently prepared on a substratum of inert material such as, for example, charcoal and may be conveniently prepared by impregnating the charcoal substratum with a solution of chlorplatinic acid and subsequently reducing the chlorplatinic acid to metallic platinum in finely divided form on the charcoal substratum.

Platinum catalysts prepared in this way, even though carefully washed after reduction, usually contain a relatively small quantity of residual chlorine that is very difficult to remove. In some processes the presence of this small quantity of chlorine has no deleterious effect but in other processes it may be desirable or necessary to remove this residual chlorine in order to carry out the catalytic process efficiently or in some cases to cause the process to proceed at all. To illustrate the type of process wherein removal of this small quantity of residual chlorine is important reference may be made to co-pending patent applications of Harold C. Urey and A. V. Grosse Serial No. 466,498, filed November 21, 1942, now Patent No. 2,690,379, and Hugh S. Taylor Serial No. 534,167, filed May 4, 1944, now Patent No. 2,362,227 which disclose processes for concentrating the deuterium-containing species in water by utilizing the hydrogen isotope exchange reaction between mixtures of hydrogen and water. In accordance with the processes disclosed in these applications a countercurrent flow of hydrogen and water is established in such manner that the hydrogen and water are intimately mixed to cause a transfer of deuterium to take place from the hydrogen to the water. Since the rate of the exchange reaction is relatively slow it is desirable that the reaction be carried out in the presence of a catalyst and finely divided platinum on a charcoal substratum has been disclosed to be a desirable catalyst.

In carrying out on a large scale the deuterium concentration processes disclosed in the above-identified applications it is usually desirable to employ process equipment made of copper or copper-containing alloys. In the case of the Taylor process, for example, wherein a hydrogen isotope exchange is effected between hydrogen gas and water vapor, the process may be carried out in exchange towers made of copper and constructed in a manner generally similar to that of the well-known bubble-cap fractionating tower except that catalyst beds are located at spaced points within the tower. The mixture of hydrogen gas and water vapor passes intermittently through the catalyst beds to cause the desired exchange reaction to occur. In the operation of such exchange towers it has been found that there is a tendency for a small amount of the copper of which the tower is made to go into solution and for a deposit of copper to form on the catalytic surfaces of the platinum catalyst thereby impairing and eventually destroying the activity of the catalyst. It has been further found that the formation of this deposit of copper is attributable to the chlorine content of the catalyst. The precise mechanism of the reaction that occurs is not fully understood but it has been definitely established that no such copper deposition takes place on the catalyst surfaces in cases where the catalyst has been substantially freed from chlorine before the tower is placed into operation.

The removal of such residual chlorine from the platinum catalyst is a difficult problem. Successive washings with water and/or treatment with an alkaline solution fail to produce the desired result. In general the chemical reagents that might be expected to work may be said to be either inadequate for removing this residual chlorine or else react in such manner as to impair the activity of the catalyst.

It is accordingly an object of the present invention to provide a method for removing residual chlorine from a finely divided platinum catalyst.

It is a further object of the invention to provide a method of removing such residual chlorine from a platinum catalyst in an efficient manner and in a relatively short period of time.

It is another object of the invention to provide a method for eliminating chlorine from a platinum-on-charcoal catalyst which method may be carried out at moderate temperatures with inexpensive reagents.

Other objects of the invention will be in part obvious and in part pointed out hereinafter.

In one of its broader aspect the present invention comprises a method of purifying a finely divided platinum catalyst containing small quantities of residual chlorine which comprises treating the catalyst alternately with dry hydrogen and wet hydrogen until the residual chlorine is substantially completely removed from the catalyst. It has been found that either dry hydrogen alone or wet hydrogen alone is capable of removing a part of the residual chlorine from the platinum catalyst but that the rate of removal is excessively slow when either material is used alone. By treating the catalyst alternately with dry hydrogen and wet hydrogen the time required for removal of the chlorine to the desired extent is substantially decreased. The present method of treating the catalyst alternately with dry and wet hydrogen is desirably carried out at an elevated temperature and good results have been obtained at temperatures as low as 60° C. and as high as 110° C. In general the time required to effect chlorine removal varies inversely as the temperature. Thus it was found that five alternate treatments with dry and wet hydrogen are desirably used at 60° C. whereas three such treatments suffice at 110° C.

In order to point out more fully the nature of the present invention the following specific example is given of a preferred embodiment of the present method.

*Example 1.*—A stream of pure dry hydrogen was passed through a bed of finely divided platinum catalyst on a charcoal substratum at a temperature of about 110° C. under such conditions as to give a space velocity of about 400 mins.$^{-1}$ (space velocity is defined as the gas flow rate in terms of volume per unit time divided by the volume of the catalyst bed). The flow of dry hydrogen through the catalyst was continued for a period of about two hours and then the dry hydrogen flow was cut off and a flow of wet hydrogen admitted to the catalyst bed. The wet hydrogen contained a quantity of water vapor such that the mixture contained 8 parts by volume of hydrogen to 1 part of water vapor. The temperature of the catalyst bed and stream of wet hydrogen was maintained at 110° C. and the flow maintained at such a value as to give the same space velocity as that used during the first step of the process, i. e. a space velocity of 400. The treatment with wet hydrogen was continued for a period of two hours and was followed by a two hour treatment with dry hydrogen under the same temperature and flow conditions. At the end of this period it was found that a sufficient proportion of the residual chlorine had been removed from the platinum catalyst to prevent copper deposition on the catalyst surfaces during the operation of the exchange towers.

*Example 2.*—A quantity of the platinum-on-charcoal catalyst was exposed alternately to streams of dry and wet hydrogen at a temperature of 60° C. and a space velocity of 400 in accordance with the schedule tabulated below.

| Hydrogen used | Duration of Treatment in hours | Grams Cl removed per 100 cc. Cat. | Cumulative percent of chlorine removed |
|---|---|---|---|
| Dry | 1 | 0.0218 | 4.5 |
| Wet | 2 | 0.0295 | 11 |
| Dry | 2 | 0.1660 | 46 |
| Wet | 1 | 0.0352 | 54 |
| Dry | 3 | 0.0620 | 67 |
| Wet | 1 | 0.0283 | 75 |

The above table indicates that at 60° C. approximately 75% of the residual chlorine can be removed from the catalyst using 6 alternate treatments with dry and wet hydrogen over a total period of about 10 hours. It is further evident that at 60° C. a greater number of steps and/or a longer period of time are required to effect a given removal of chlorine.

From the above description it is apparent that the present invention provides a simple and efficient method for removal of residual chlorine from a platinum-on-charcoal catalyst. By using the present method such residual chlorine is effectively removed to such an extent that the catalyst may be used in contact with process equipment constructed of copper and copper alloys with no danger of deposition of copper on the catalyst surfaces and consequent impairment of their catalytic activity.

Since many embodiments might be made of the present invention and since many changes might be made in the embodiment described above, it is to be understood that the foregoing description is to be interpreted as illustrative only and not in a limiting sense.

I claim:
1. The method of purifying a finely divided platinum catalyst containing small quantities of chlorine which comprises treating said catalyst at an elevated temperature with dry hydrogen, then treating said catalyst at an elevated temperature with wet hydrogen having a hydrogen-water vapor volume ratio of about 8:1, and repeating said dry hydrogen and wet hydrogen treatments until said chlorine is largely removed from said catalyst.

2. The method of purifying a finely divided platinum catalyst containing small quantities of chlorine which comprises exposing said catalyst alternately for periods of about two hours to streams of dry and wet hydrogen at a temperature between 60° C. and 110° C. until said chlorine is largely removed from said catalyst.

3. The method of purifying a finely divided platinum catalyst containing small quantities of chlorine which comprises treating said catalyst with dry hydrogen at a temperature of about 110° C. for a period of about two hours, treating said catalyst with wet hydrogen at a temperature of 110° C. for a period of about two hours, and again treating said catalyst with dry hydrogen at about 110° C. for a period of about two hours to remove said chlorine from said catalyst.

References Cited in the file of this patent

Berkman: "Catalysis," Reinhold Publishing Co., 1940, 243–244.